United States Patent
Houle (12) United States Patent (10) Patent No.: US 10,774,766 B2
(45) Date of Patent: Sep. 15, 2020

(54) METHOD FOR ENGINE BRAKING A VEHICLE HAVING A CONTINUOUSLY VARIABLE TRANSMISSION

(71) Applicant: BOMBARDIER RECREATIONAL PRODUCTS INC., Valcourt (CA)

(72) Inventor: Jean-Philippe Houle, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/677,754

(22) Filed: Nov. 8, 2019

(65) Prior Publication Data

US 2020/0072145 A1 Mar. 5, 2020

Related U.S. Application Data (62) Division of application No. 16/277,404, filed on Feb. 15, 2019, now Pat. No. 10,502,153, which is a
(Continued)

(51) Int. Cl.
*F02D 41/08* (2006.01)
*B60W 10/06* (2006.01)
(Continued)

(52) U.S. Cl.
CPC ............. *F02D 41/08* (2013.01); *B60W 10/06* (2013.01); *B60W 10/107* (2013.01);
(Continued)

(58) Field of Classification Search
CPC .... F02D 11/106; F02D 41/00; F02D 41/0002; F02D 41/0215; F02D 41/08; F02D 41/16;
(Continued)

(56) References Cited

U.S. PATENT DOCUMENTS 4,680,987 A 7/1987 Morimoto
5,056,637 A 10/1991 Miyawaki et al.
(Continued)

FOREIGN PATENT DOCUMENTS

JP S58191359 A 11/1983
JP 2000062501 A 2/2000

OTHER PUBLICATIONS

English Abstract of JP2000062501A retieved from https://worldwide.espacenet.com/ on Mar. 25, 2020.
(Continued)

*Primary Examiner* — John Kwon
*Assistant Examiner* — Johnny H Hoang
(74) *Attorney, Agent, or Firm* — BCF LLP (57) ABSTRACT

A method for controlling an internal combustion engine of a vehicle having a continuously variable transmission is disclosed. When a driven pulley speed is less than a predetermined driven pulley speed and an actual engine speed is less than an engine speed causing a driving pulley speed to be a driving pulley engagement speed: controlling the engine to increase the actual engine speed to increase the driving pulley speed to be at least the driving pulley engagement speed. When the driven pulley speed is above the predetermined driven pulley speed, the actual engine speed is greater than the engine speed causing the driving pulley speed to be the driving pulley engagement speed, and the desired engine speed is less than the engine speed causing the driving pulley speed to be the driving pulley engagement speed: controlling the engine to operate under conditions corresponding to an engine braking speed.

19 Claims, 6 Drawing Sheets

Related U.S. Application Data division of application No. 15/531,918, filed as application No. PCT/IB2016/052458 on Apr. 29, 2016, now Pat. No. 10,247,123.

(60) Provisional application No. 62/155,039, filed on Apr. 30, 2015.

(51) Int. Cl.
　　*B60W 10/107* (2012.01)
　　*F02D 41/16* (2006.01)
　　*F02D 41/02* (2006.01)
　　*F02D 11/10* (2006.01)
　　*B60W 30/18* (2012.01)
　　*F02D 41/00* (2006.01)
　　*F16H 63/50* (2006.01)

(52) U.S. Cl.
　　CPC ..... *B60W 30/18136* (2013.01); *F02D 11/106* (2013.01); *F02D 41/0002* (2013.01); *F02D 41/0215* (2013.01); *F02D 41/16* (2013.01); *F16H 63/50* (2013.01); *B60W 2510/104* (2013.01); *B60W 2710/0644* (2013.01); *B60Y 2300/18133* (2013.01); *F02D 2200/0404* (2013.01); *F02D 2200/501* (2013.01); *F02D 2200/602* (2013.01)

(58) Field of Classification Search
　　CPC .......... F02D 2200/0404; B60W 10/06; B60W 10/107; B60W 10/18136; B60Y 2300/18133; F16H 9/12; F16H 9/16; F16H 61/66; F16H 63/06; F16H 63/065; F16H 63/067; F16H 63/50

USPC .............. 123/339.1, 339.13, 339.21, 339.26; 701/102, 103, 110–115

See application file for complete search history.

(56) References Cited

U.S. PATENT DOCUMENTS

| | | |
|---|---|---|
| 6,149,540 A | 11/2000 | Johnson et al. |
| 7,072,754 B1 | 7/2006 | Sherrod |
| 7,678,016 B2 | 3/2010 | Nakayama |
| 8,682,549 B2 | 3/2014 | Roberge et al. |
| 8,731,791 B2 | 5/2014 | Hamane et al. |
| 8,755,962 B2 | 6/2014 | Suzuki |
| 2002/0152989 A1 | 10/2002 | Price |
| 2006/0194671 A1* | 8/2006 | Katou ............... F16H 61/66272 477/46 |
| 2008/0178839 A1 | 7/2008 | Oshima et al. |
| 2012/0083979 A1* | 4/2012 | Inoue .................... B60W 10/06 701/55 |
| 2014/0278000 A1 | 9/2014 | Yamanaka et al. |
| 2014/0309912 A1 | 10/2014 | Hirano et al. |
| 2015/0075360 A1* | 3/2015 | Takahashi ............... F16H 61/06 91/361 |

OTHER PUBLICATIONS

English Abstract of JPS58191359A retieved from https://worldwide.espacenet.com/ on Mar. 25, 2020.

Search Report issued from the Chinese Patent Office dated Dec. 17, 2019 in connection with the corresponding application No. 201680005428.2.

International Search Report of PCT/IB2016/052458; Lee W. Young; dated Oct. 11, 2016.

* cited by examiner

METHOD FOR ENGINE BRAKING A VEHICLE HAVING A CONTINUOUSLY VARIABLE TRANSMISSION

CROSS-REFERENCE

The present application is a divisional application of U.S. patent application Ser. No. 16/277,404, filed Feb. 15, 2019, which is a divisional application of U.S. patent application Ser. No. 15/531,918, filed May 31, 2017, which is a National Phase Entry Application of International Patent Application No. PCT/IB2016/052458, filed Apr. 29, 2016, which claims priority to U.S. Provisional Patent Application No. 62/155,039, filed Apr. 30, 2015, the entirety of all of which is incorporated herein by reference.

TECHNICAL FIELD

The present technology relates to a method for engine braking a vehicle having a continuously variable transmission.

BACKGROUND

In a wheeled vehicle powered by an internal combustion engine, when the driver releases the throttle operator, such as the throttle pedal, the throttle valve almost completely closes. As a result very little air can be supplied to the engine. When this happens, if the vehicle is in movement and the engine is still connected to the wheels, the wheels want to turn the crankshaft of the engine at a speed corresponding to the speed required to move the vehicle at the speed the vehicle is currently going. However, because of the position of the throttle valve, a vacuum is created in the engine, and the torque applied on the crankshaft by the wheels needs to work against this vacuum. As a result, the engine slows down the vehicle or, in the case of a vehicle going down a hill, at least reduces the vehicle's acceleration. This is known as engine braking.

One of the main advantages of engine braking is that, by assisting in reducing the speed of the vehicle, it can help reduce wear on the brakes normally used to brake the wheels.

Certain vehicles are provided with a continuously variable transmission (CVT) to transfer torque from the engine to the wheels. A CVT has a driving pulley, a driven pulley and a belt looped around the pulleys to transmit torque between the pulleys. In most situations for a vehicle having a CVT, releasing the throttle operator would result in engine braking.

However, some CVTs have a driving pulley that is actuated centrifugally. Centrifugally actuated driving pulleys have a pair of sheaves that move closer together as the speed of the driving pulley increases. As such, in some centrifugally actuated driving pulleys, at low driving pulley speeds the sheaves are too far apart to clamp the belt therebetween. Therefore, releasing the throttle pedal when the driving pulley speed is low would not result in engine braking since the belt turns freely relative to the driving pulley and the rotation of the wheels and the driven pulley is not opposed by the engine's resistance. This would occur for example when a vehicle starts going down a hill from rest with the engine idling.

In order to address this problem, some centrifugally actuated driving pulleys are provided with a clutch, or other mechanism to cause the belt to transfer torque to the crankshaft of the engine if the belt turns freely relative to the driving pulley. In one example, the driving pulley is provided with an overrunning clutch which causes the belt to apply torque to the crankshaft if it turns relative to the crankshaft/driving pulley by more than a certain speed. When the overrunning clutch is engaged, engine braking is applied.

Although these mechanisms provide a solution to the problem of the engine not providing engine braking under certain conditions, they also add cost, weight and complexity to the vehicle.

It would therefore be desirable to provide a solution to the problem of vehicles having a CVT with a centrifugally actuated driving pulley that do not have engine braking under certain conditions.

SUMMARY

It is an object of the present to ameliorate at least some of the inconveniences present in the prior art.

According to an aspect of the present technology, there is provided a method for controlling an internal combustion engine of a vehicle. The vehicle has the internal combustion engine and a continuously variable transmission (CVT). The CVT has a driving pulley operatively connected to the engine, a driven pulley, and a belt looped around the driving and driven pulleys, the belt transmitting torque between the driving and driven pulleys. The vehicle also has at least one ground engaging member operatively connected to the driven pulley. The method comprises: determining a first speed, the first speed being proportional to a driven pulley speed; determining an idle speed set point based at least in part on the first speed, the idle speed set point being less than an engagement speed when the driven pulley speed is less than a predetermined driven pulley speed, the idle speed set point being less than an actual engine speed when the driven pulley speed is greater than the predetermined driven pulley speed; determining a desired engine speed; and controlling the engine to operate under conditions corresponding to the idle speed set point when the desired engine speed is less than the idle speed set point, controlling the engine to operate under conditions corresponding to the idle speed set point causing engine braking when the driven pulley speed is greater than the predetermined driven pulley speed.

According to some implementations of the present technology, the idle speed set point is greater than the engagement speed when the driven pulley speed is greater than the predetermined driven pulley speed.

According to some implementations of the present technology, when the driven pulley speed is less than the predetermined driven pulley speed, the idle speed set point increases as the driving pulley speed increases.

According to some implementations of the present technology, determining the idle speed set point comprises multiplying the driven pulley speed by a CVT target ratio.

According to some implementations of the present technology, determining the idle speed set point further comprises subtracting an engine speed offset from a result of the driven pulley speed being multiplied by the CVT target ratio.

According to some implementations of the present technology, the CVT target ratio is based on the actual engine speed.

According to some implementations of the present technology, the engine speed offset increases as the actual engine speed increases.

According to some implementations of the present technology, the vehicle also has a geared transmission operatively connecting the at least one ground engaging member to the driven pulley. The first speed is a speed of a rotating element operatively connecting the geared transmission to the at least one ground engaging member. The method further comprises determining a drive mode of the geared transmission. The driven pulley speed is determined by multiplying the first speed by a gear ratio corresponding to the drive mode.

According to some implementations of the present technology, the method further comprises determining a throttle operator position. The desired engine speed is based at least in part on the throttle operator position.

According to some implementations of the present technology, controlling the engine to operate under conditions corresponding to the idle speed set point when the driven pulley speed is greater than the predetermined range of driven pulley speeds comprises: positioning a valve controlling a supply of air to the engine at a position that is less than a position that would be necessary to operate the engine at the actual engine speed.

According to some implementations of the present technology, the valve is a throttle valve of a throttle body.

According to some implementations of the present technology, the method further comprises determining an actual engine speed.

According to some implementations of the present technology, determining the actual engine speed includes determining a speed of rotation of a driveshaft operatively connecting the engine to the at least one ground engaging member.

According to some implementations of the present technology, determining the actual engine speed includes determining a vehicle speed.

According to some implementations of the present technology, the engagement speed is a driving pulley engagement speed.

According to some implementations of the present technology, the vehicle also has a centrifugal clutch operatively connecting the driving pulley to the engine. The engagement speed is a clutch engagement speed.

According to another aspect of the present technology, there is provided a method for controlling an internal combustion engine of a vehicle going downhill with a throttle operator in an idle position. The vehicle has the internal combustion engine, the throttle operator, and a continuously variable transmission (CVT). The CVT has a driving pulley operatively connected to the engine, a driven pulley, and a belt looped around the driving and driven pulleys, the belt transmitting torque between the driving and driven pulleys. The vehicle also has at least one ground engaging member operatively connected to the driven pulley. The driven pulley initially has a driven pulley speed below a predetermined driven pulley speed. The method comprises: determining a first speed, the first speed being proportional to the driven pulley speed; as the driven pulley speed increases and the driven pulley speed is below the predetermined driven pulley speed, increasing an actual engine speed as the driven pulley speed increases; the actual engine speed being an engagement speed when the driven pulley speed is the predetermined driven pulley speed; and as the driven pulley speed continues to increase and the driven pulley speed is above the predetermined driven pulley speed: controlling the engine to operate under conditions corresponding to an engine braking speed thereby causing engine braking, the engine braking speed being less than the actual engine speed.

According to some implementations of the present technology, the engine braking speed is greater than the engagement speed.

According to some implementations of the present technology, the engagement speed is a driving pulley engagement speed.

According to some implementations of the present technology, the vehicle also has a centrifugal clutch operatively connecting the driving pulley to the engine. The engagement speed is a clutch engagement speed.

According to some implementations of the present technology, controlling the engine to operate under conditions corresponding to the engine braking speed comprises: positioning a valve controlling a supply of air to the engine at a position that is less than a position that would be necessary to operate the engine at the actual engine speed.

According to some implementations of the present technology, the valve is a throttle valve of a throttle body.

According to some implementations of the present technology, the method further comprises determining an actual engine speed.

According to some implementations of the present technology, determining the actual engine speed includes determining a speed of rotation of a driveshaft operatively connecting the engine to the at least one ground engaging member.

According to some implementations of the present technology, determining the actual engine speed includes determining a vehicle speed.

According to another aspect of the present technology, there is provided a method for controlling an internal combustion engine of a vehicle. The vehicle has the internal combustion engine and a continuously variable transmission (CVT). The CVT has a driving pulley operatively connected to the engine, a driven pulley, and a belt looped around the driving and driven pulleys, the belt transmitting torque between the driving and driven pulleys. The vehicle also has at least one ground engaging member operatively connected to the driven pulley. The method comprises: determining a first speed, the first speed being proportional to a driven pulley speed; determining a throttle operator position; determining a desired engine speed corresponding to the throttle operator position; when the driven pulley speed is less than a predetermined driven pulley speed and an actual engine speed is less than an engine speed causing a driving pulley speed to be a driving pulley engagement speed: controlling the engine to increase the actual engine speed to increase the driving pulley speed to be at least the driving pulley engagement speed; and when the driven pulley speed is above the predetermined driven pulley speed, the actual engine speed is greater than the engine speed causing the driving pulley speed to be the driving pulley engagement speed, and the desired engine speed is less than the engine speed causing the driving pulley speed to be the driving pulley engagement speed: controlling the engine to operate under conditions corresponding to an engine braking speed thereby causing engine braking, the engine braking speed being less than the actual engine speed.

According to some implementations of the present technology, the engine braking speed is greater than the engine speed causing the driving pulley speed to be the driving pulley engagement speed.

According to some implementations of the present technology, the driving pulley speed is equal to the actual engine speed.

According to some implementations of the present technology, when the driven pulley speed is less than the predetermined driven pulley speed and the actual engine speed is less than the engine speed causing the driving pulley speed to be the driving pulley engagement speed, the method further comprises: controlling the engine to increase the actual engine speed as the driven pulley speed increases.

According to some implementations of the present technology, the method further comprises determining the engine braking speed. Determining the engine braking speed comprises multiplying the driven pulley speed by a CVT target ratio.

According to some implementations of the present technology, determining the engine braking speed further comprises: subtracting an engine speed offset from a result of the driven pulley speed being multiplied by the CVT target ratio.

According to some implementations of the present technology, the CVT target ratio is based on the actual engine speed.

According to some implementations of the present technology, the engine speed offset increases as the actual engine speed increases.

According to some implementations of the present technology, the vehicle also has a geared transmission operatively connecting the at least one ground engaging member to the driven pulley. The first speed is a speed of a rotating element operatively connecting the geared transmission to the at least one ground engaging member. The method further comprises determining a drive mode of the geared transmission. The driven pulley speed is determined by multiplying the first speed by a gear ratio corresponding to the drive mode.

According to some implementations of the present technology, controlling the engine to operate under conditions corresponding to the engine braking speed comprises: positioning a valve controlling a supply of air to the engine at a position that is less than a position that would be necessary to operate the engine at the actual engine speed.

According to some implementations of the present technology, the valve is a throttle valve of a throttle body.

According to some implementations of the present technology, the method further comprises determining an actual engine speed.

According to some implementations of the present technology, determining the actual engine speed includes determining a speed of rotation of a driveshaft operatively connecting the engine to the at least one ground engaging member.

According to some implementations of the present technology, determining the actual engine speed includes determining a vehicle speed.

According to another aspect of the present technology, there is provided a method for controlling an internal combustion engine of a vehicle. The vehicle has the internal combustion engine, a valve for controlling a supply of air to the engine, a throttle operator adapted for actuation by a user of the vehicle, an electronic control unit (ECU), a valve actuator operatively connected to the valve for controlling a position of the valve based on signals from the ECU, and a continuously variable transmission (CVT). The CVT has a driving pulley operatively connected to the engine, a driven pulley, and a belt looped around the driving and driven pulleys, the belt transmitting torque between the driving and driven pulleys. The vehicle has at least one ground engaging member operatively connected to the driven pulley. The method comprises: controlling, with the valve actuator based on signals from the ECU, the position of the valve independently of a throttle operator position such that the driving pulley reaches a driving pulley engagement speed when a pulley speed ratio is less than a maximum CVT ratio, the pulley speed ratio corresponding to a driving pulley speed divided by a driven pulley speed.

According to some implementations of the present technology, the method further comprises, once the driving pulley has reached the driving pulley engagement speed: operating the engine independently of the throttle operator position such that conditions under which the engine is operated correspond to an engine braking speed, the engine braking speed being less than an actual engine speed thereby causing engine braking.

According to some implementations of the present technology, the engine braking speed is greater than the driving pulley engagement speed.

According to some implementations of the present technology, operating the engine independently of the throttle operator position such that conditions under which the engine is operated correspond to an engine braking speed comprises: positioning the valve at a position that is less than a position that would be necessary to operate the engine at the actual engine speed According to some implementations of the present technology, controlling the position of the valve independently of a throttle operator position such that the driving pulley speed reaches the driving pulley engagement speed comprises increasing the opening of the valve.

According to some implementations of the present technology, the valve is a throttle valve and the valve actuator is a throttle valve actuator.

According to another aspect of the present technology, there is provided a method for controlling an internal combustion engine of a vehicle. The vehicle has the internal combustion engine, at least one ground engaging member operatively connected to the driven pulley, and a centrifugal clutch having an input shaft operatively connected to the engine and an output shaft operatively connected to the at least one ground engaging member. The method comprises determining a first speed, the first speed being proportional to an output shaft speed; determining a throttle operator position; determining a desired engine speed corresponding to the throttle operator position; when the output shaft speed is less than a predetermined output shaft speed and an actual engine speed is less than an engine speed causing an input shaft speed to be a clutch engagement speed: controlling the engine to increase the actual engine speed to increase the input shaft speed to be at least the clutch engagement speed; and when the output shaft speed is above the predetermined output shaft speed, the actual engine speed is greater than the engine speed causing the input shaft speed to be the clutch engagement speed, and the desired engine speed is less than the engine speed causing the input shaft speed to be the clutch engagement speed: controlling the engine to operate under conditions corresponding to an engine braking speed thereby causing engine braking, the engine braking speed being less than the actual engine speed.

According to some implementations of the present technology, the engine braking speed is greater than the engine speed causing the input shaft speed to be the clutch engagement speed.

According to some implementations of the present technology, when the output shaft speed is less than the predetermined output shaft speed and the actual engine speed is less than the engine speed causing the input shaft speed to be the clutch engagement speed, the method further comprises: controlling the engine to increase the actual engine speed as the output shaft speed increases.

According to some implementations of the present technology, controlling the engine to operate under conditions corresponding to the engine braking speed comprises: positioning a valve controlling a supply of air to the engine at a position that is less than a position that would be necessary to operate the engine at the actual engine speed.

According to some implementations of the present technology, the valve is a throttle valve of a throttle body.

For purposes of this application terms related to spatial orientation such as forwardly, rearward, left, and right, are as they would normally be understood by a driver of the vehicle sitting thereon in a normal driving position. Also, for purposes of this application, the terms "above", "higher" and "greater than" when referring to a position of the throttle valve compared to another position of the throttle valve mean a position of the throttle valve where the throttle valve is more opened than at the other position. Similarly the terms "below", "lower" and "less than" when referring to a position of the throttle valve compared to another position of the throttle valve mean a position of the throttle valve where the throttle valve less opened than at the other position.

Exemplary implementations of the present method have at least one of the above-mentioned aspects, but do not necessarily have all of them. It should be understood that example implementations of the present method may have other aspects not specifically recited herein.

Additional and/or alternative features, aspects, and advantages of implementations of the present vehicle will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with reference to a side-by-side recreational utility vehicle (RUV) 10. However, it is contemplated that aspects of the present technology could be used in other types of vehicles having a continuously variable transmission (CVT) such as a straddle-type all-terrain vehicle (ATV), a snowmobile, a motorcycle, and a three-wheeled vehicle to name a few.

Figure 1:
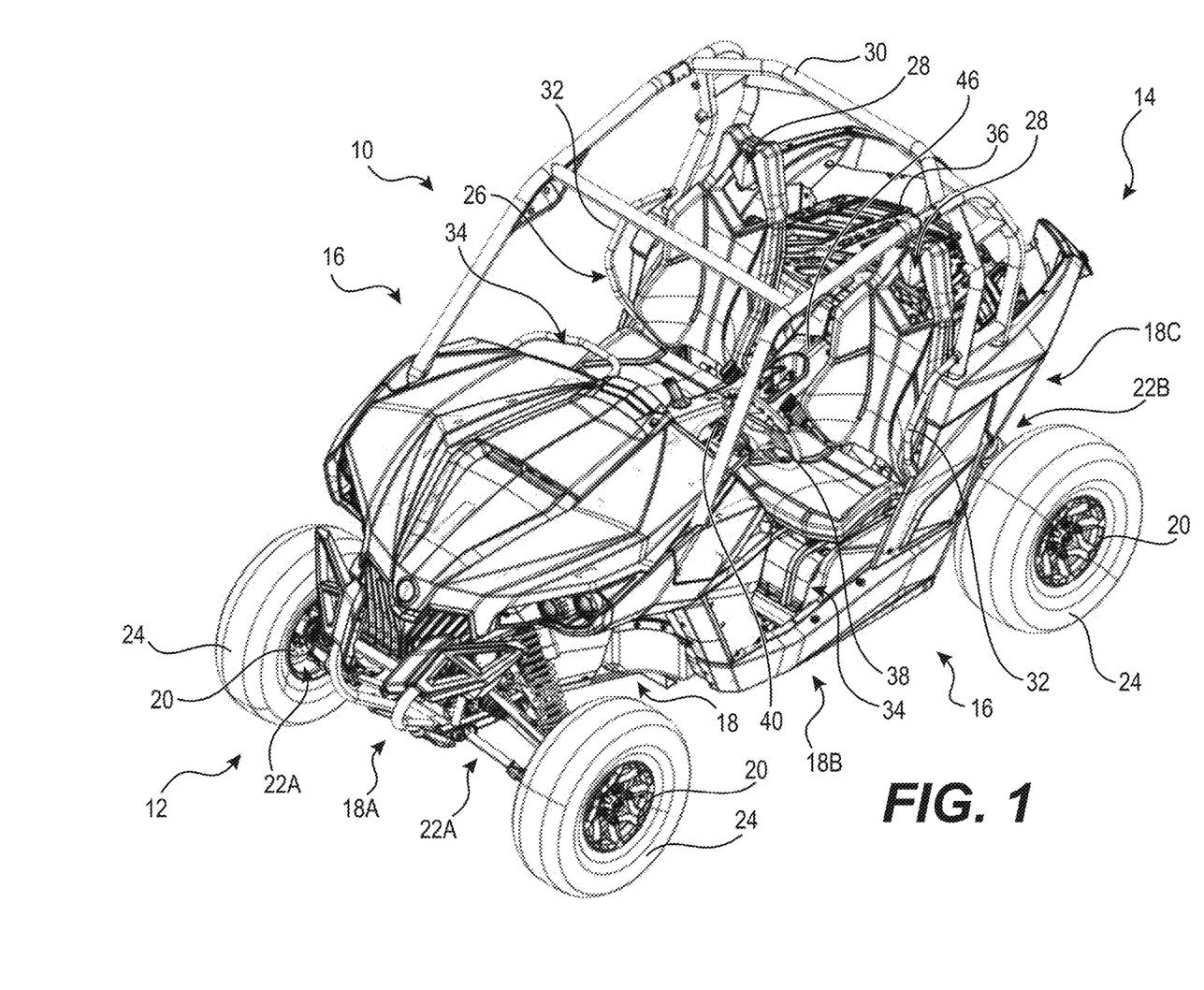
FIG. 1 is a perspective view taken from a front, left side of a recreational utility vehicle (RUV)

FIG. 1 illustrates the RUV 10. The RUV 10 has a front end 12, a rear end 14, and two lateral sides 16 (left and right). The RUV 10 includes a frame 18 to which a vehicle body is mounted. The frame 18 has a front portion 18A, a middle portion 18B and a rear portion 18C. A pair of front ground engaging members, which in the present application is a pair of front wheels 20, is suspended from the front portion 18A of the frame 18 via front suspension assemblies 22A. A pair of rear ground engaging members, which in the present implementation is pair of rear wheels 20, is suspended from the rear portion 18C of the frame 18 via rear suspension assemblies 22B. Each of the four wheels 20 has a tire 24. A cockpit area 26 is disposed in the middle portion 18B of the frame 18. The cockpit area 26 comprises two seats 28 (left and right). Each seat 28 is a bucket seat having a seat base and a backrest. It is contemplated that the seats 28 could be other types of recumbent seats. Each seat 28 is also provided with a seat belt (not shown). The left and right seats 28 are mounted laterally beside each other to accommodate a driver and a passenger respectively of the RUV 10 (i.e. riders).

A roll cage 30 is connected to the frame 18 and is disposed above the cockpit area 26. The roll cage 30 is an arrangement of metal tubes that contributes to protecting the riders. The roll cage 30 has several attachment points to the frame 18. The roll cage 30 further includes a pair of lateral restraining members 32, one on each side of a rear part of the roll cage 30. The lateral restraining members 32 extend forward from the rear part of the roll cage 30. The lateral restraining members 32 are U-shaped tubes which help protect an upper body of the riders. It is contemplated that the lateral restraining members 32 could have a different shape. It is also contemplated that the restraining members 32 could be omitted.

The cockpit area 26 is open at the two lateral sides 16 of the RUV 10, forming two lateral passages 34 (left and right), through which the riders can ingress and egress the RUV 10. A lateral cover (not shown) is selectively disposed across each lateral passage 34. The lateral covers are made of flexible straps and flexible panels of meshed material. When the riders are riding the RUV 10, the lateral covers are intended to be disposed across the lateral passages 34. However, when the riders are not riding the RUV 10 and they desire to either ingress or egress the cockpit area 26, the lateral covers can be opened to clear the lateral passages 34.

A cargo rack 36 is mounted to the frame portion 18C of the frame 18 rearward of the seats 28. It is contemplated that the cargo rack 36 could be replaced by a cargo box pivotally mounted to the frame portion 18C of the frame 18 rearward of the seats 28. It is contemplated that the cargo rack 36 could be omitted.

A steering device including a steering wheel 38 is disposed in front of the left seat 28. It is contemplated that, the steering wheel 38 could be disposed in front of the right seat 28. The steering device is operatively connected to the two front wheels 20 to permit steering of the RUV 10. A display cluster 40 is disposed in front of the steering wheel 38. A throttle operator in the form of a throttle pedal 42 (shown in FIG. 2) is disposed over the floor of the cockpit area 26 below the steering wheel 38 and in front of the left seat 28.

Figure 2:
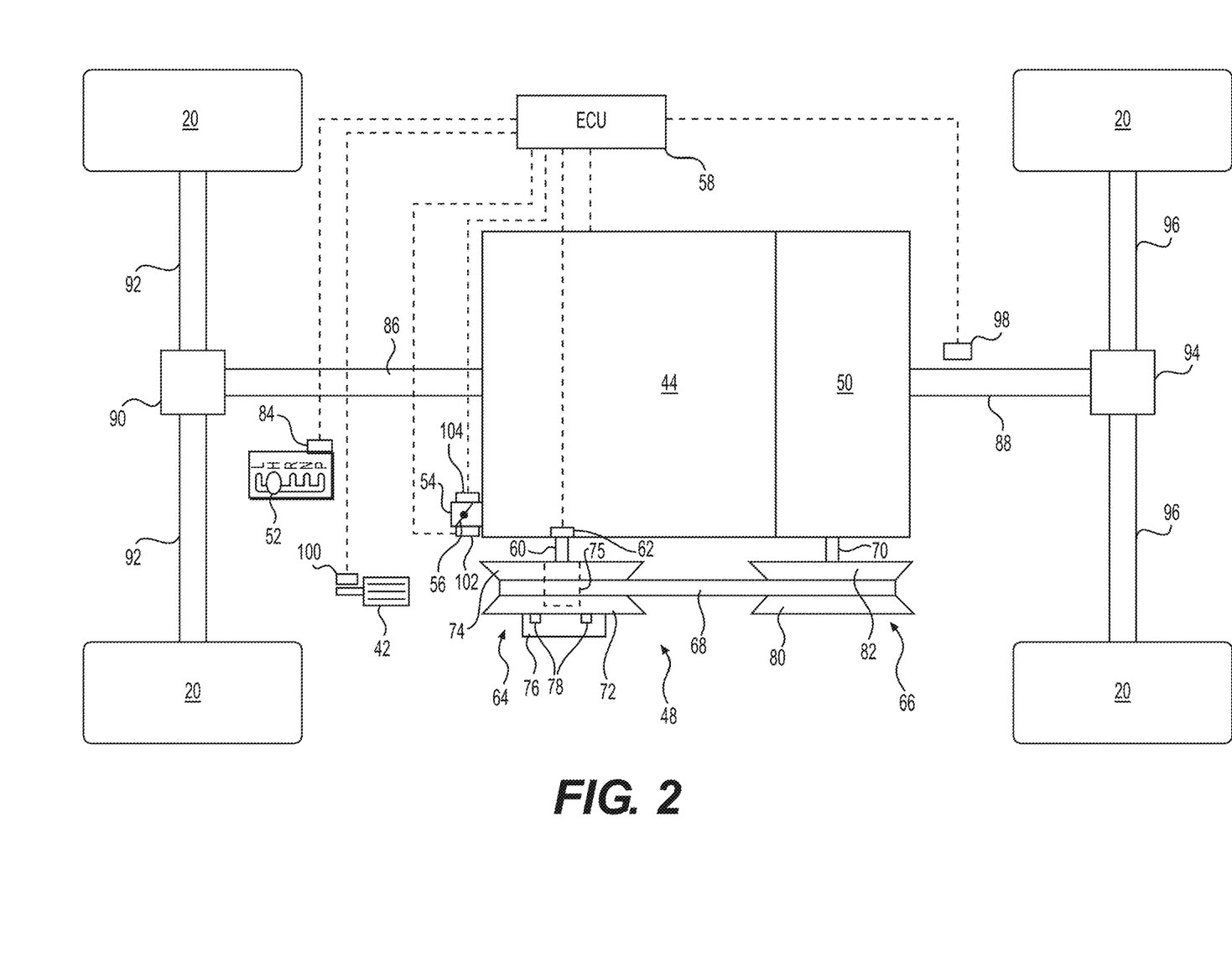
FIG. 2 is a schematic representation of the power train and some associated components of the RUV of FIG. 1.

An engine 44 (shown in FIG. 2) is mounted to the middle portion 18B of frame 18 and has a portion disposed between the right and the left seats 28. The engine 44 is operatively connected to the four wheels 20 to power the RUV 10 as will be described in greater detail below. It is contemplated that the engine 44 could be operatively connected only to the rear wheels 20 or could selectively switch between driving two and four wheels 20. A console 46 positioned between the right and left seats 28 covers and separates the engine 44 from the driver and the passenger. The console 46 defines in part a central cooling tunnel allowing air to flow from the front end 12 of the vehicle 10 to the rear end 14 of the vehicle to cool the engine 44. The engine 44 is an internal combustion, four-stroke, V-twin engine. Accordingly, the engine 44 has two cylinders extending at an angle from each other. It is contemplated that other types of engines could be used. For example, the engine 44 could be a two-stroke engine with in-line cylinders. The engine 44 transmits torque to the wheels 20 via a continuously variable transmission (CVT) 48 and a gear-type transmission 50 (FIG. 2). A shifter 52 (FIG. 2) located near the steering wheel 38 enables a driver to select one of a plurality of drive modes provided by the transmission 50. In the present implementation, the drive modes include park, neutral, reverse, low, and high. It is contemplated that the transmission 50 could have other drive modes.

Fuel to be supplied to the engine 44 is stored in a fuel tank (not shown) disposed under the passenger seat 28. The fuel tank is mounted to the middle portion 18B of the frame 18.

Turning now to FIG. 2, a power pack, a power train and some associated components of the RUV 10 will be described.

The engine 44 has intake and exhaust ports (not shown). An air intake manifold (not shown) is connected to the intake ports of the engine 44 to deliver air to the combustion chambers (not shown) of the engine 44. A throttle body 54 is fluidly connected to the intake manifold and is disposed upstream thereof. The throttle body 54 has a throttle valve 56 pivotally supported therein.

During operation of the engine 44, the throttle valve 56 is movable between a wide open throttle valve position and a minimum position. In the wide open throttle valve position, a maximum amount of air for the current operating conditions is supplied to the engine 44. In the minimum position, the throttle valve 66 is slightly opened and a minimum amount of air for the current operating conditions is supplied to the engine 44. It is contemplated that the minimum position could correspond to the throttle valve being fully closed, in which case apertures are provided in the throttle valve 56 or bypass passages are provided in the throttle body 54 to provide some air to the engine 44.

In order to control the operation of the engine 44, an electronic control unit (ECU) 58 is provided. The ECU 58 receives signals from various sensors (some of which are described below), and sends signals to various components to control the operation of these components based on the signals received from the sensors. Although only one ECU 58 is shown, it is contemplated that the ECU 58 could be replaced by multiple control units sharing the various functions of the ECU 58. Also, in the implementation described, the various components connected to the ECU 58 are electrically connected to the ECU 58 by wires. However, it is contemplated that one or more of the various components could be wirelessly connected to the ECU 58 to permit the wireless exchange of signals therebetween.

The engine 44 has an output shaft which, in the present implementation, is the crankshaft 60 of the engine 44. It is contemplated that the output shaft could be a shaft operatively connected to the crankshaft 60 of the engine 44. In such an implementation, it is contemplated that the output shaft could turn at a speed that is different from the speed of the crankshaft 60. An engine speed sensor 62 senses a speed of rotation of the crankshaft 60, which is referred to herein as the engine speed. The engine speed sensor 62 is electrically connected to the ECU 58 to send a signal representative of the engine speed to the ECU 58.

The CVT 48 has a driving pulley 64, a driven pulley 66 and a drive belt 68 looped around the pulleys 64, 66. In the present implementation, the drive belt 68 is a rubber V-belt, but other types of belts are contemplated. The driving pulley 64 is mounted on the crankshaft 60. As such, in the present implementation, the driving pulley speed is equal to the engine speed sensed by the engine speed sensor 62. In implementations where the output shaft is not the crankshaft 60, the driving pulley 64 is mounted on the output shaft and the driving pulley speed can be determined from the engine speed sensor 62 based on the transmission ratio between the crankshaft 60 and the output shaft. The driven pulley 66 is mounted on an input shaft 70 of the transmission 50.

The driving pulley 64 has a movable sheave 72, a fixed sheave 74 and a spider 76. The spider 76 has a plurality of pivotable centrifugal weights 78. As the driving pulley speed increases, the centrifugal weights 78 push on the movable sheave 74 to move the movable sheave 74 toward the fixed sheave 72, thereby increasing the effective diameter of the driving pulley 64. A spring (not shown) biases the movable sheave 74 away from the fixed sheave 72. At low driving pulley speeds, the space between the fixed and movable sheaves 72, 74 causes the driving pulley 64 to turn relative to the drive belt 68. As the driving pulley speed increases, the fixed and movable sheaves 72, 74 move closer together and the belt 68 is eventually sufficiently clamped between the fixed and movable sheaves 72, 74 that torque can be transferred between the driving pulley 64 and the belt 68. The driving pulley speed at which this clamping of the belt 68 occurs is referred to herein as the driving pulley engagement speed. As the driving pulley speed increases, the effective diameter of the driving pulley 64 increases. It is contemplated that another type of centrifugally actuated driving pulley could be used.

In an alternative implementation, a centrifugal clutch 75 (shown in dotted lines in FIG. 2) is connected between the driving pulley 64 and the crankshaft 60. In this implementation, the driving pulley 64 constantly engages the belt 68. At low engine speeds, the centrifugal clutch 75 is disengaged and the driving pulley 64 can turn relative to the crankshaft 60 by being driven by the driven pulley 66 via the belt 68. The engine speed at which the clutch 75 is engaged is referred to herein as the clutch engagement speed.

The driven pulley 66 has a fixed sheave 80 and a movable sheave 82. The driven pulley 66 includes a torque-sensitive mechanism that adjusts the effective diameter of the driven pulley 66.

The input shaft 70 of the transmission 50 on which the driven pulley 66 is mounted engages an input gear (not shown) of the transmission 50. The transmission 50 contains a number of gears that can be selectively engaged to change the speed/torque ratio between the input and output of the transmission 50, and/or to change the direction of rotation of the input versus the output of the transmission 50. By changing a position of the shifter 52, the gears that are engaged in the transmission 50 change, which results in the transmission 50 operating in a different drive mode. A shifter position sensor 84 senses a position of the shifter 52 and sends a signal representative of the shifter position to the ECU 58. In the present implementation, the shifter 52 is mechanically connected to the transmission 50 via a push-pull cable (not shown) that moves a gear selector (not shown) thereby selecting the drive mode. It is contemplated that instead of a mechanical connection, the transmission 50 could be provided with an electric motor coupled to the gear selector and that the electric motor could be controlled by the ECU 58 based on the signaled received by the ECU 58 from the shifter position sensor 84. It is also contemplated that the shifter position sensor 84 could sense a position of the gear selector.

The transmission 50 is operatively connected to a front driveshaft 86 and a rear driveshaft 88. The front driveshaft 86 is connected to a front differential 90. The front differential 90 is connected to two front half-shafts 92. The front half-shafts 92 are connected to the front wheels 20. The rear driveshaft 88 is connected to a rear differential 94. The rear differential 94 is connected to two rear half-shafts 96. The rear half-shafts 96 are connected to the rear wheels 20. Universal joints (not shown) provide the connections between the driveshafts 86, 88, differentials 90, 94, half-shafts 92, 96 and the wheels 20. It is contemplated that the driveshafts 86, 88, and half-shafts 92, 96, although each shown as being unitary shaft, could be made of multiple shafts. It is also contemplated that one of the driveshafts 86, 88 could be omitted in the case of a two-wheel drive vehicle. It is also contemplated that one of the driveshafts 86, 88 could be selectively connected to the transmission 50 thereby permitting the RUV 10 to operate in a two-wheel drive mode or a four-wheel drive mode.

A speed sensor 98 is electrically connected to the ECU 58. The speed sensor 98 senses a speed of rotation of the rear driveshaft 88 and sends a signal representative of this speed to the ECU 58. By knowing the transmission ratio (input speed (i.e. driven pulley side) over output speed (i.e. driveshaft side)) based on the signal from the shifter position sensor 84, the ECU 58 can determine the driven pulley speed by multiplying the speed sensed by the speed sensor 98 by the transmission ratio. The ECU 58 also uses the signal from the speed sensor 98 to calculate the vehicle speed, based on the diameter of the wheels 20 and the input to output ratio of the differential 94. It is contemplated that the speed sensor 98 could alternatively sense the speed of rotation of the driveshaft 86, one of the half-shafts 92, 96, a rotating component associated with one of the wheels 20 (a brake disk for example), one of the wheels 20, a rotating element of one of the differentials 90, 94, a shaft of the transmission 50, the input shaft 70 or the driven pulley 66.

A throttle operator position sensor 100 senses a position of the throttle pedal 42. The throttle operator position sensor 100 is electrically connected to the ECU 58 and sends a signal representative of the position of the throttle pedal 42 to the ECU 58. The throttle pedal 42 is movable between a 0 percent throttle operator position, which is the position of the throttle pedal 42 when the driver completely releases the pedal 42, and a 100 percent throttle operator position, which is the position of the pedal 42 when the driver fully depresses the pedal 42. The pedal 42 is biased toward the 0 percent throttle operator position. In vehicles using a throttle operator other than a throttle pedal 42, such as a twist grip or a throttle lever for example, the throttle operator position sensor 100 is adapted to sense the position of the particular type of throttle operator. It is contemplated that the throttle operator position sensor 100 could sense the position of an element of the RUV 10 other than the throttle pedal 42 that is moved by the throttle pedal 42, in which case the ECU 58 could determine the throttle operator position by using the positional relationship between the throttle pedal 42 and the element.

A throttle valve actuator 102 is disposed on a left side of the throttle body 54. The throttle valve actuator 102 is connected to the throttle valve 56 to pivot the throttle valve 56 between its various positions. The throttle valve actuator 102 is electrically connected to the ECU 58 and receives signals from the ECU 58. The throttle valve actuator 102 moves the throttle valve 56 based on the signals received from the ECU 58. In the present implementation, the throttle valve actuator 102 is a rotary electrical motor, but other types of throttle valve actuators are contemplated. Systems of this type are sometimes referred to as throttle-by-wire systems.

A throttle valve position sensor 104 senses a position of the throttle valve 56 by sensing a position of a shaft of the throttle valve actuator 102. It is contemplated that the throttle valve position sensor 104 could sense the position of the throttle valve 56 directly. It is also contemplated that the throttle valve position sensor 104 could be integrated into the throttle valve actuator 102. The throttle valve position sensor 104 is electrically connected to the ECU 58 and sends a signal representative of the position of the throttle valve 56 to the ECU 58.

It is contemplated that in alternative implementations of the power pack and of the power train, other sensors could be used in addition to or instead of the sensors described above.

During acceleration of the RUV 10, the driver presses on the throttle pedal 42 and the engine 44 drives the crankshaft 60, which drives the driving pulley 64. Assuming that the driving pulley 64 is turning at a speed above the driving pulley engagement speed, the driving pulley 64 engages the belt 68 and drives the belt 68, which in turn drives the driven pulley 66. The driven pulley 66 drives the input shaft 70. The input shaft 70 drives the transmission 50. The transmission 50, which operates according to the drive mode selected by the shifter 52, drives the driveshafts 86, 88 (unless the transmission 50 is in the neutral mode). The driveshafts 86, 88 drive their respective differentials 90, 94. The differentials 90, 94 then drive their respective wheels 20 via their respective half-shafts 92, 96.

With the RUV 10 in movement and the driving pulley 64 operating above the driving pulley engagement speed, when the driver releases the throttle pedal 42, the ECU 58 sends a signal to the throttle valve actuator 102 to close the throttle valve 56. As such, the engine 44 is now being controlled under conditions corresponding to an engine speed that is less than the actual engine speed. Under these conditions, the wheels 20 drive the half-shafts 92, 96, which drive the differentials 80, 94, which drive the driveshafts 86, 88, which drive the transmission 50. The transmission 50, which operates according to the drive mode selected by the shifter 52, drives the input shaft 70 (unless the transmission 50 is in the neutral mode). The input shaft 70 drives the driven pulley 66, which drives the belt 68. Since the driving pulley 64 is operating above the driving pulley engagement speed, the driving pulley 64 clamps the belt 68 and the belt 68 drives the driving pulley 64. The driving pulley 64 drives the crankshaft 60. The speed at which the driving pulley 64 drives the crankshaft 60 (i.e. the actual engine speed) is greater than the speed at which the engine 44 is being controlled to run. Since the engine 44 is being controlled to run under conditions corresponding to an engine speed that is less than the actual engine speed (i.e. the throttle valve 56 is not sufficiently opened), engine braking is applied. For example, if the driving pulley 64 drives the engine 44 at an actual engine speed of 2200 RPM, but the position of the throttle valve 56 corresponds to a position at which the engine 44 would normally be running at 1900 RPM, the conditions under which the engine 44 is being controlled to run result in insufficient air being supplied to the engine 44 compared to what would normally be necessary to drive the engine 44 at 2200 RPM. As a result, a vacuum is created in the engine 44 which resists the torque being applied by the driving pulley 64 to the crankshaft 60, and engine braking occurs. The greater the difference is between the actual engine speed and the speed corresponding to the conditions under which the engine 44 is being controlled to operate, the greater the amount of engine braking is.

In accordance with the present technology, with the RUV 10 in movement, or starting to move from rest, such as when starting to go down a hill, and the driving pulley 64 operating below the driving pulley engagement speed, when the driver releases the throttle pedal 42 (if it is not already released), the ECU 58 sends a signal to the throttle valve actuator 102 to close the throttle valve 56 to a position corresponding to an idle speed set point as will be described further below. As in the conditions described above, under these conditions, the wheels 20 drive the half-shafts 92, 96, which drive the differentials 80, 94, which drive the driveshafts 86, 88, which drive the transmission 50. The transmission 50, which operates according to the drive mode selected by the shifter 52, drives the input shaft 70 (unless the transmission 50 is in the neutral mode). The input shaft 70 drives the driven pulley 66, which drives the belt 68. Contrary to the conditions described above, since the driving pulley 64 is operating below the driving pulley engagement speed, the driving pulley 64 does not clamp the belt 68 and the belt 68 does not drive the driving pulley 64. As such, no engine braking is initially provided. The present technology provides a method, described below, through which engine braking will be provided as the driven pulley speed and vehicle speed increase without the need of a mechanical device, such as a one-way clutch, as in the prior art.

Figure 3:
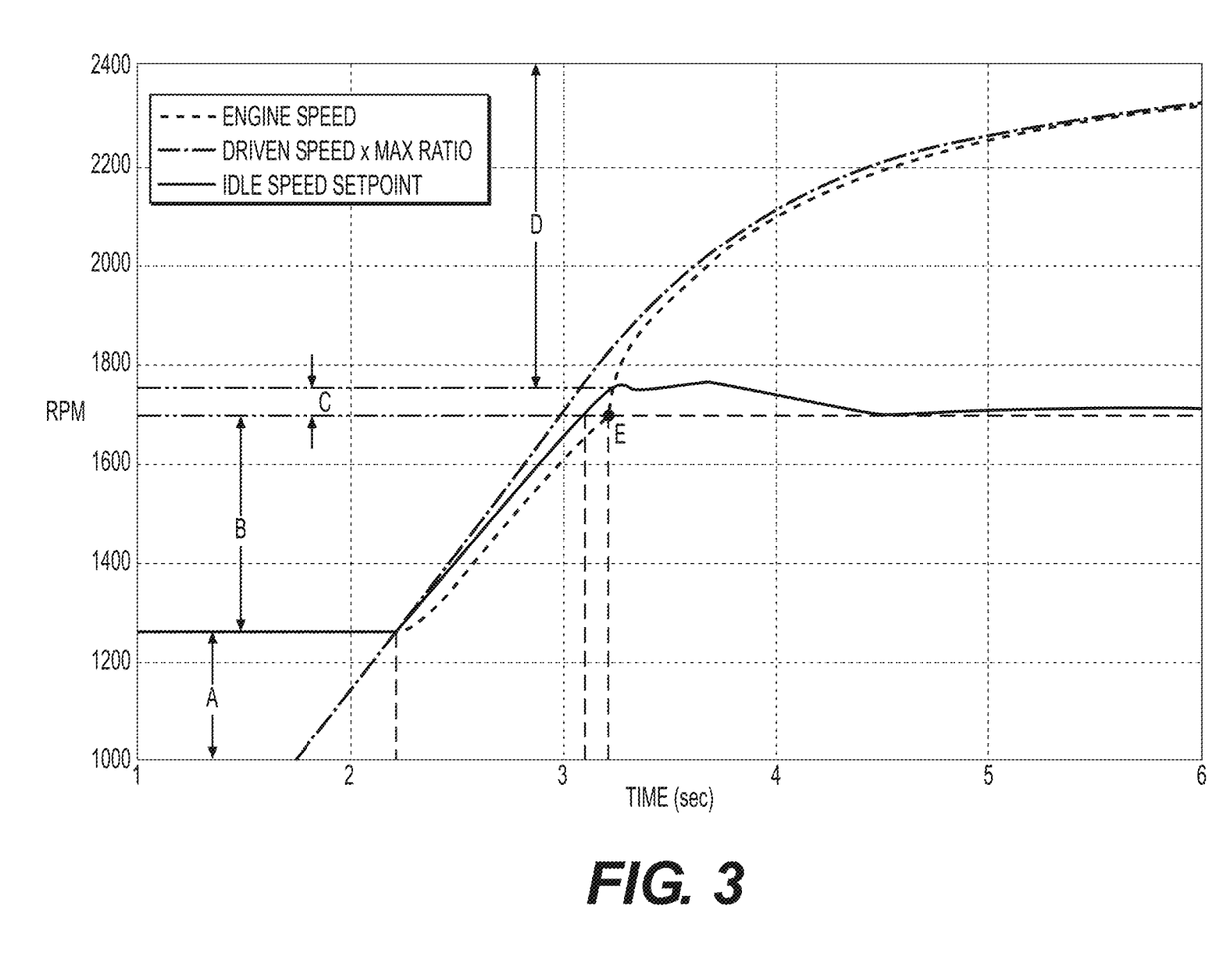
FIG. 3 is a graph illustrating the engine speed, the driven pulley speed and the idle speed set point over time in accordance with an implementation of a method for engine braking.
Figure 4:
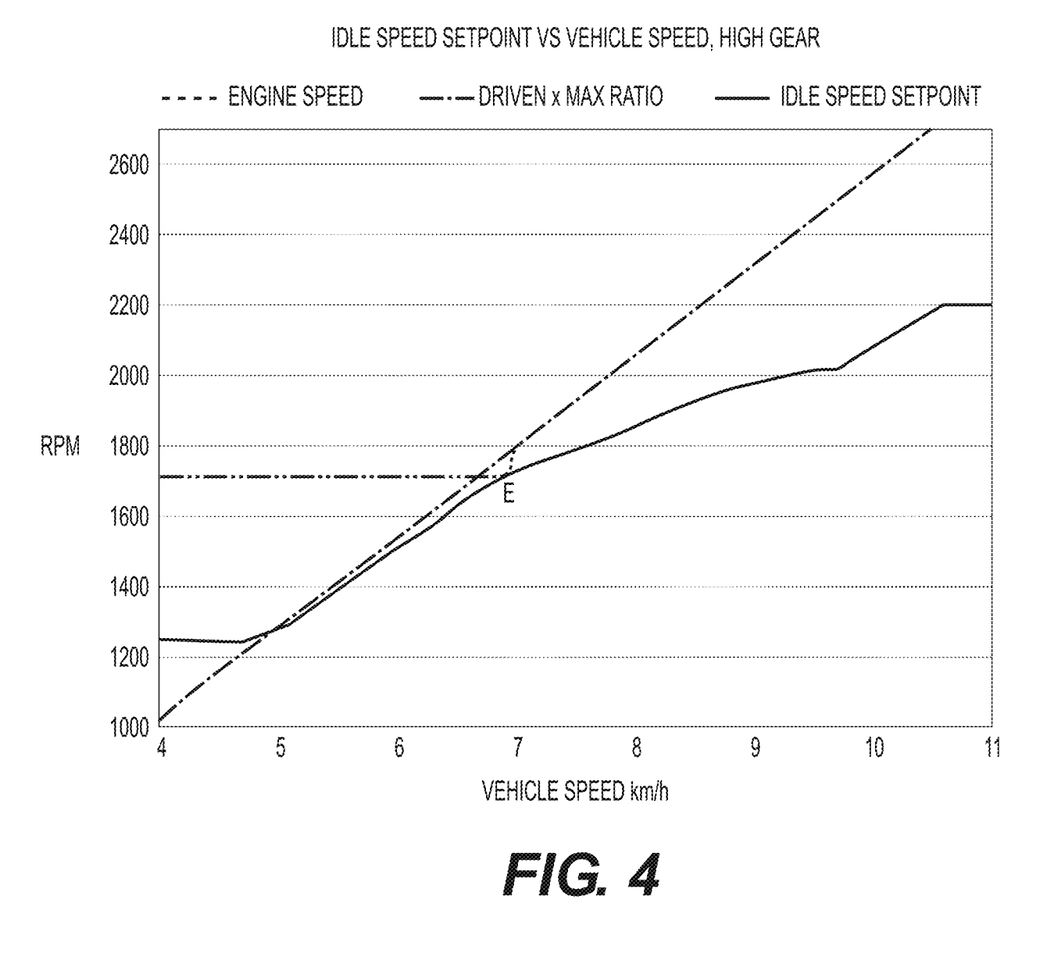
FIG. 4 is a graph illustrating the driven pulley speed and the idle speed set point over vehicle speed in accordance with the method for engine braking.

The present method will be described with reference to FIGS. 3 to 5. The graphs of FIGS. 3 and 4 illustrate scenarios applying the present method where the RUV 10 is going down a hill, with the throttle pedal 42 completely released, and the RUV 10 accelerating due to gravity. In the graph of FIG. 3, the actual engine speed is illustrated by a dashed line. In the graphs of FIGS. 3 and 4, the driven pulley speed is illustrated by a dashed-dot line, and the values of the driven pulley speed have been multiplied by the maximum CVT ratio, which in the present exemplary implementation is 2.85. The CVT ratio is the ratio of the driving pulley speed over the driven pulley speed and it is also the ratio of the effective driven pulley diameter over the effective driving pulley diameter. The maximum CVT ratio is the CVT ratio when the driven pulley 66 is at its maximum effective diameter and the driving pulley 64 is at its minimum effective diameter. By multiplying the driven pulley speed by the maximum CVT ratio, the dashed-dot line also illustrates the speed at which the driving pulley 64 would be operating with the driving pulley 64 engaging the belt 68 and the CVT 48 being at the maximum CVT ratio. In the graphs of FIGS. 3 and 4, the idle speed set point is illustrated by a solid line. The idle speed set point is a value calculated by the ECU 58 of the conditions, including the position of the throttle valve 56, under which the engine 44 should be operated to apply the present method. In the present implementation, the idle speed set point is the minimum desired engine speed for a given driven pulley speed. In the present method, the ECU 58 controls the engine 44 to operate under conditions that would provide the idle speed set point if no external forces accelerating the RUV 10 were acting on the RUV 10. In the present scenarios, the external force is the force component of gravity resulting from the RUV 10 going down a hill. An implementation of a method of calculating the idle set point will be discussed in greater detail below with respect to FIG. 5. It should be understood that the graphs of FIGS. 3 and 4 correspond to a specific example under specific conditions and it should be understood that the shape of the various curves and the various values, such as the driving pulley engagement speed, would differ for a different CVT, vehicle, engine and/or hill incline to name a few of the variables that would affect the appearance of the curves.

During operation of the RUV 10, the ECU 58 determines the desired engine speed based on the signals receive from at least the throttle operator position sensor 100. The ECU 58 may also additionally use signals from one or more of the other sensors to determine the desired engine speed. If the desired engine speed is less than the idle speed set point for the current driven pulley speed, then the ECU 58 controls the position of the throttle valve 56, via the throttle valve actuator 102, and other engine parameters to operate under conditions corresponding to the idle speed set point. This occurs without any driver intervention. Should the desired engine speed be greater than the idle speed set point, then the ECU 58 controls the position of the throttle valve 56 and other engine parameters to operate under conditions corresponding to the desired engine speed. For example, when the driver completely releases the throttle pedal 42, this is indicative of a desired engine speed corresponding to the minimum operating speed of the engine 44, which for the example provided in FIG. 3 corresponds to about 1250 RPM. However, should the idle speed set point for the given driven pulley speed be higher than this, the ECU 58 will operate the engine under conditions corresponding to the idle speed set point.

In an alternative implementation (not shown), an air bypass valve is provided in an idle air bypass passage and the position of the air bypass valve is controlled by an air bypass valve actuator. As the details of the construction of a throttle body having such an idle air bypass passage, valve and actuator are believed to be known to a person skilled in the art, they will not be provided herein. In such an implementation, if the desired engine speed is less than the idle speed set point for the current driven pulley speed, then the ECU 58 controls the position of the air bypass valve, via the air bypass valve actuator, and other engine parameters to operate under conditions corresponding to the idle speed set point. This occurs without any driver intervention.

Turning now to FIG. 3, the method will be explained according to the scenario described above (i.e. the RUV 10 is going down a hill, with the throttle pedal 42 completely released, and the RUV 10 accelerating due to gravity) in terms of speed versus time. In the present scenario, the shifter 52 is in the high position and the transmission 50 operates in high mode accordingly. Also in the present scenario, the driving pulley 64 does not initially engage the belt 68. As the RUV 10 accelerates due to gravity, the driven pulley speed increases linearly. In the present implementation, when the driven pulley speed is less than about 439 RPM (1250 RPM divided by 2.85 (maximum CVT ratio), range A in FIG. 3), the idle speed set point is constant at 1250 RPM, which corresponds to the minimum operating speed of the engine 44. The ECU 58 controls the engine 44 to operate under conditions corresponding to the constant idle set point. Under these conditions, the throttle valve actuator 102 moves the throttle valve 56 to its minimum position (i.e. at its position where the least amount of air is supplied to the engine). As the driving pulley 64 is operating below the driving pulley engagement speed, no external torques from the drive belt 68 are being applied on the crankshaft 60, and the actual engine speed corresponds to the idle speed set point (i.e. 1250 RPM).

Once the driven pulley speed exceeds the minimum operating speed of the engine 44 (i.e. 439 RPM) as the RUV 10 continues to accelerate, which in the graph occurs at about 2.2 seconds, the idle speed set point increases as the driven pulley speed increases (range B in FIG. 3). As can be seen, the idle speed set point increases at a slower rate than the driven pulley speed, but it is contemplated that the idle speed set point could increase at the same or at greater rate than the driven pulley speed. As the ECU 58 continues to operate the engine 44 under conditions corresponding to the idle speed set point, the throttle valve 56 is increasingly opened as the idle speed set point increases. As a result, since the conditions under which the ECU 58 operates the engine 44 correspond to an engine speed (i.e. the idle speed set point) that is greater than the actual engine speed (i.e. the throttle valve 56 is sufficiently opened), the engine 44 accelerates and the actual engine speed sensed by the engine speed sensor 62 increases.

As the RUV 10 continues to accelerate, the driven pulley speed also continues to increase, and the idle speed set point eventually increases to the driving pulley engagement speed (lower end of range C in FIG. 3). In the present implementation, this occurs at about 3.1 seconds when the idle speed set point reaches the driving pulley engagement speed of 1700 RPM. The idle speed set point continues to increase and shortly after the idle speed set point has reached the driving pulley engagement speed (i.e. with the idle speed set point at the upper end of range C), at about 3.2 seconds, due to the delay in engine response, the actual engine speed also reaches the driving pulley engagement speed (point E in FIG. 3). Once the actual engine speed reaches the driving pulley engagement speed, the driving pulley 64 also turns at the driving pulley engagement speed and clamps the belt 68. It is contemplated that the rate at which the idle speed set point increases prior to the driving pulley 64 reaching the driving pulley engagement speed could be modified from what is illustrated in FIG. 3 such that the driving pulley 64 reaches the driving pulley speed sooner or later than illustrated.

As can be seen, once the driving pulley 64 engages the belt 68, the driving pulley speed quickly increases. This is because torque is now transmitted to the driving pulley 64 by the belt 68 and the driving pulley speed that would correspond to the driven pulley speed (i.e. driven pulley speed multiplied by the CVT ratio) is higher than the driving pulley speed due to the acceleration the RUV 10 has undergone. As described above, when the driven pulley speed multiplied by the CVT ratio is higher than the driving pulley speed with the driving pulley 64 engaging the belt 68, the wheels 20 drive the half-shafts 92, 96, which drive the differentials 80, 94, which drive the driveshafts 86, 88, which drive the transmission 50, which drives the input shaft 70 (unless the transmission 50 is in the neutral mode), which drives the driven pulley 66, which drives the belt 68, which drives the driving pulley 64, which finally drives the crankshaft 60.

Once the driving pulley speed exceeds the idle speed set point (range D in FIG. 3), which determines the conditions under which the engine 44 is being controlled under the above described operating conditions, the speed at which the driving pulley 64 drives the crankshaft 60 (i.e. the actual engine speed) is greater than the speed at which the engine 44 is being controlled to run (i.e. the idle speed set point). Since the idle speed set point is less than the actual engine speed, engine braking is applied because the throttle valve 56 is being controlled to be at a position that is less than a position that would be necessary to operate the engine 44 at the actual engine speed. The effects of engine braking can be seen in FIG. 3 by the slope of the driven pulley speed that starts decreasing in range D, thus indicating a reduction in the acceleration of the vehicle 10.

As can be seen in FIG. 3, once the driving pulley speed exceeds the idle speed set point, the idle speed set point is first decreased slightly, then increased, then decreased almost to the driving pulley engagement speed, and then constantly increased at a small rate. This control strategy provides a smooth transition to the engine braking condition, but it is contemplated that it could differ from what is illustrated. In the present implementation, the idle speed set point is always maintained above the driving pulley engagement speed once the driving pulley 64 has reached the driving pulley engagement speed. However, it is contemplated that the idle speed set point could be reduced below the driving pulley engagement speed once the driving pulley 64 has reached the driving pulley engagement speed. As explained above, the amount of engine braking being applied increases as the difference between the driving pulley speed and the speed at which the engine 44 is being controlled to operate (i.e. the idle speed set point) increases. As such, once the driving pulley 64 engages the belt 68, the value of the idle speed set point is determined based on the amount of engine braking that is desired. In the present implementation, once the driving pulley 64 has reached the driving pulley engagement speed, the idle speed set point is controlled to reduce the acceleration of the RUV 10. Since by operating the engine 44 under conditions corresponding to the idle speed set point results in engine braking once the driving pulley 64 has reached the driving pulley engagement speed, this portion of the idle speed set point is said to be an engine braking speed. As can also be seen in range D of FIG. 3, once the driving pulley speed exceeds the idle speed set point, the driving pulley speed increases until it catches up to the speed at which it should be operating for the current driven pulley speed (i.e. the driven pulley speed multiplied by the CVT ratio).

Accordingly, in the present method, when the driven pulley speed increases and the driving pulley speed is below the driving pulley engagement speed, the ECU 58 controls the engine 44 to operate under conditions corresponding to the idle speed set point which increases as the driven pulley speed increases. This is done, for example, by increasing the amount of air introduced into the engine 44 by opening of the throttle valve 56 or by opening an air bypass valve should one be present independently of the position of the throttle pedal position such that the air introduced into the engine 44 is greater than that which would be introduced to the engine 44 were the valve position be the one corresponding to the position of the throttle pedal 42. As a result, the actual engine speed, and therefore the driving pulley speed, increases. Should the driven pulley speed continue to increase, the driving pulley speed eventually reaches the driving pulley engagement speed, thus permitting engine braking. Once the driving pulley 64 engages the belt 68, controlling the engine 44 to operate under conditions corresponding to the idle speed set point results in engine braking. This control of the engine 44 by the ECU 58 is done independently of driver input (i.e. the driver does not have to press the throttle pedal 42 in order to increase the driving pulley speed to initiate engine braking).

The above method can also be applied in terms of the ratio of pulley speeds. When the driving pulley 64 is operating at a speed below the driving pulley engagement speed and the actual driving pulley speed divided by the actual driven pulley speed (i.e. the ratio of pulley speeds) is less than the maximum CVT ratio (i.e. the maximum ratio possible with the belt 68 engaged by the driving pulley 64), which is 2.85 in the present exemplary implementation, the ECU 58 controls the operation of the engine 44 such that the driving pulley 64 reaches the driving pulley engagement speed. As discussed above, the ECU 58 determines the driving and driven pulley speeds from the sensors 62 and 98 respectively. Accordingly, when the CVT ratio is less than 2.85, the ECU 58 controls the engine 44 to increase the idle speed set point to force the engagement of the driving pulley 64. This is done, for example, by increasing the amount of air introduced into the engine 44 by opening the throttle valve 56 or by opening an air bypass valve should one be present. Once the driving pulley 64 engages the belt 68, controlling the engine 44 to operate under conditions corresponding to the idle speed set point results in engine braking. As above, this control of the engine 44 by the ECU 58 is done independently of driver input (i.e. the driver does not have to press the throttle pedal 42 in order to increase the driving pulley speed). As such, the amount of air introduced to the engine 44 is greater than that which would be introduced to the engine 44 were the throttle valve position be the one corresponding to the position of the throttle pedal 42.

Turning now to FIG. 4, the method will be explained according to the scenario described above (i.e. the RUV 10 is going down a hill, with the throttle pedal 42 completely released, and the RUV 10 accelerating due to gravity) in terms of rotation speed versus vehicle speed. In the present scenario, the shifter 52 is in the high position and the transmission 50 operates in high mode accordingly. Also in the present scenario, the driving pulley 64 does not initially engage the belt 68. In the present implementation, the vehicle speed is calculated using the signal received from the speed sensor 98. It is contemplated that the vehicle speed could be obtained from other sensors or inputs. For example, the vehicle speed could be obtained from a global positions system that obtains the vehicle speed by determining the displacement of the RUV 10 over time. It should be noted that the engine speed line (i.e. dotted line) in FIG. 4 is not visible prior to point E and shortly after point E and can only be seen between point E and the dashed-dot line. This is because before point E, the engine speed line overlaps the solid line and that shortly after point E the engine speed line overlaps the dashed-dot line. As there is a direct correlation between vehicle speed and driven pulley speed, the ECU 58 controls the engine 44 to operate under conditions corresponding to the idle speed set point in a manner similar to the one described above for FIG. 3. For simplicity, in view of this and in view of the direct correlation between engine speed and driven pulley speed, the control of the engine 44 over these ranges will not be explained herein in detail. Prior to the driving pulley 64 reaching the driving pulley engagement speed (i.e. point E), the ECU 58 controls the operation of the engine 44 so as to increase the engine speed as the vehicle speed increases, and therefore the driven pulley speed, until the driving pulley engagement speed is reached. Once the driving pulley speed reaches the driving pulley engagement speed (i.e. point E), the actual engine speed increases such that the driving pulley speed matches the driving pulley speed at which it should be operating for the current driven pulley speed (i.e. the driven pulley speed multiplied by the CVT ratio), and the ECU 58 controls the engine 44 to operate under conditions corresponding to an idle speed set point that is less than the actual engine speed to cause engine braking, similarly to what is described above with respect to FIG. 3. In the present implementation, once the engine braking speed reaches 2200 RPM, the engine braking speed is held constant at this value by the ECU 58. It is contemplated that the engine braking speed could alternatively keep increasing as vehicle speed increases or that it could instead decrease.

In the implementation described above with respect to FIG. 2 in which the RUV 10 is provided with the centrifugal clutch 75, the ECU 58 would control the operation of the engine 44 in the same manner as described above with respect to FIGS. 3 and 4, but instead of the control being based relative to the driving pulley engagement speed, it is relative to the clutch engagement speed. For example, should the clutch 75 be disengaged, with the throttle pedal 42 being completely released and the driven pulley speed increasing, the ECU 58 controls the operation of the engine 44 to increase the engine speed as the driven pulley speed increases until the clutch engagement speed is reached and once the clutch 75 is engaged, the ECU 58 controls the operation of the engine 44 to cause engine braking.

Figure 5:
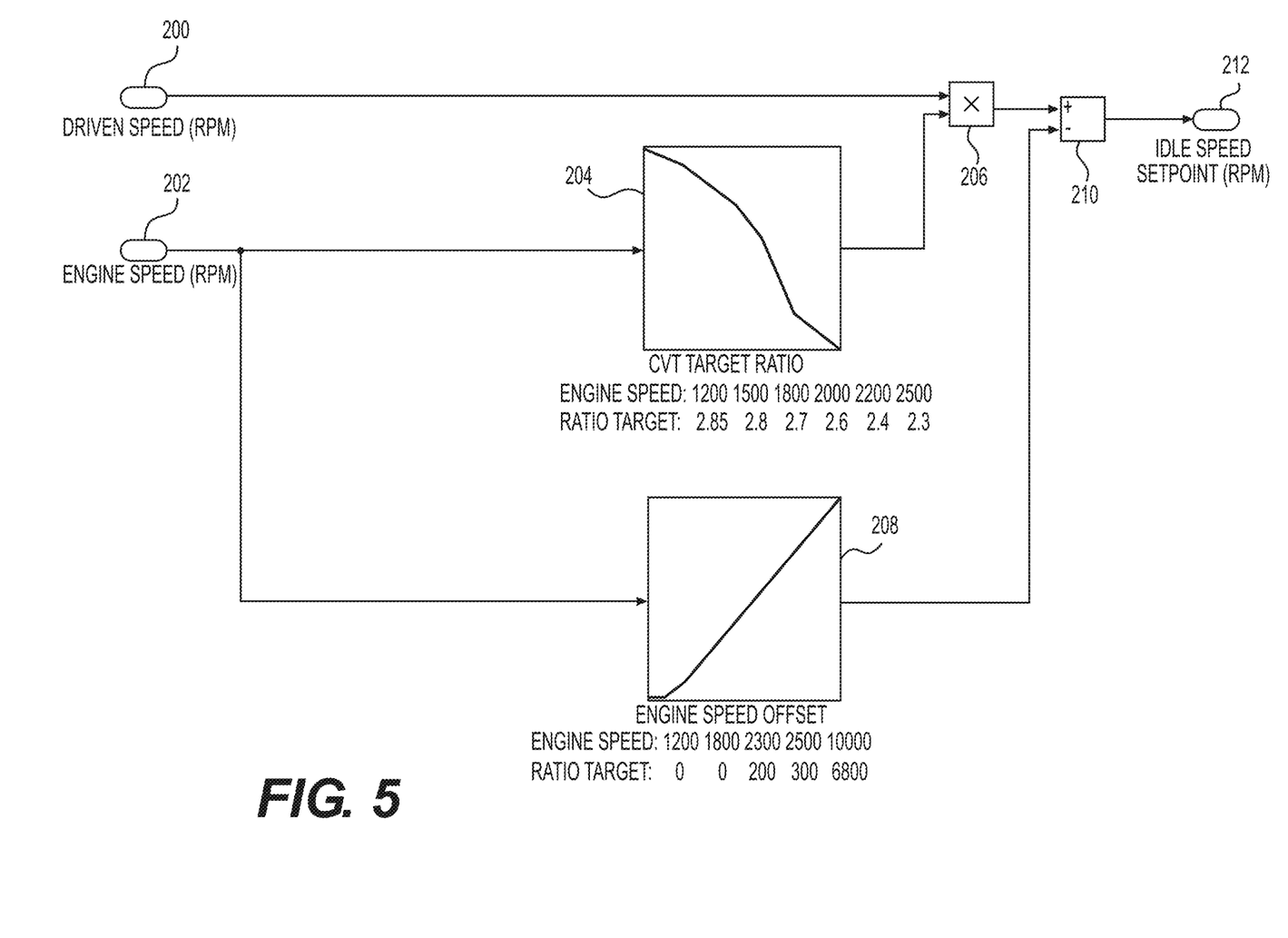
FIG. 5 is a schematic representation of a function used to calculate the idle speed set point.

Turning now to FIG. 5, an exemplary method used by the ECU 58 to determine the idle speed set point will be described. In the present implementation, the ECU 58 is constantly determining the idle speed set point for the current operating conditions of the RUV 10. It is however contemplated that the ECU 58 could only determine the idle speed set point when certain conditions exist. For example, it is contemplated that the ECU 58 could only determine the idle speed set point when the throttle pedal 42 is actuated by less than a certain amount or is completely released by the driver of the RUV 10.

At step 200, the ECU 58 determines the current driven pulley speed. The ECU 58 receives signals from the sensor 98 that senses a speed of rotation of the rear driveshaft 88. From these signals, the ECU 58 determines the speed of the rear driveshaft 88. The ECU 58 also receives a signal from the shifter position sensor 84 that senses the position of the shifter 52. From this signal, the ECU 58 determines the operation mode of the transmission 50 and therefore the corresponding gear ratio of the transmission 50. The ECU 58 obtains the driven pulley speed from the rear driveshaft 88 speed and the gear ratio of the transmission 50. As previously mentioned, it is also contemplated that the ECU 58 could determine the driven pulley speed directly from a sensor sensing the speed of rotation of the driven pulley 66 or the transmission input shaft 70, in which case it would not be necessary to determine the operation mode of the transmission 50 to determine the driven pulley speed.

At step 202, the ECU 58 determines the actual engine speed from signals received from the engine speed sensor 62. Using the actual engine speed determined at step 202, at step 204 the ECU 58 determines a CVT target ratio corresponding to the actual engine speed. The CVT target ratio is determined by finding, in a lookup table or graph stored in the ECU 58 or a separate memory, the CVT target ratio corresponding to the actual engine speed. For engine speeds that are between engine speeds in the lookup table, the corresponding CVT target ratio is determined through interpolation. The value of the CVT target ratio decreases as the actual engine speed increases. At step 206, the ECU 58 multiplies the driven pulley speed determined at step 200 by the CVT target ratio determined at step 204. It is contemplated that steps 204 and 206 could be omitted.

Using the actual engine speed determined at step 202, at step 208 the ECU 58 determines an engine speed offset. The engine speed offset is determined by finding, in a lookup table or graph stored in the ECU 58 or a separate memory, the engine speed offset corresponding to the actual engine speed. For engine speeds that are between engine speeds in the lookup table, the corresponding engine speed offset is determined through interpolation. The value of the engine speed offset increases as the actual engine speed increases. At step 210, the ECU 58 subtracts the engine speed offset determined at step 208 from the result of the multiplication of step 206. The result of this subtraction (step 212) is the idle speed set point for the driven pulley speed determined at step 200 and the actual engine speed determined at step 202 used in the method described above with respect to FIG. 3. It is contemplated that steps 208 and 210 could be omitted.

The values shown for the CVT target ratio and engine speed offset shown in FIG. 5 are only one example. These values can be determined experimentally according to the desired handling behavior of the RUV 10 and will vary depending on the specific construction of the RUV 10, the engine 44 and the CVT 48.

Figure 6:
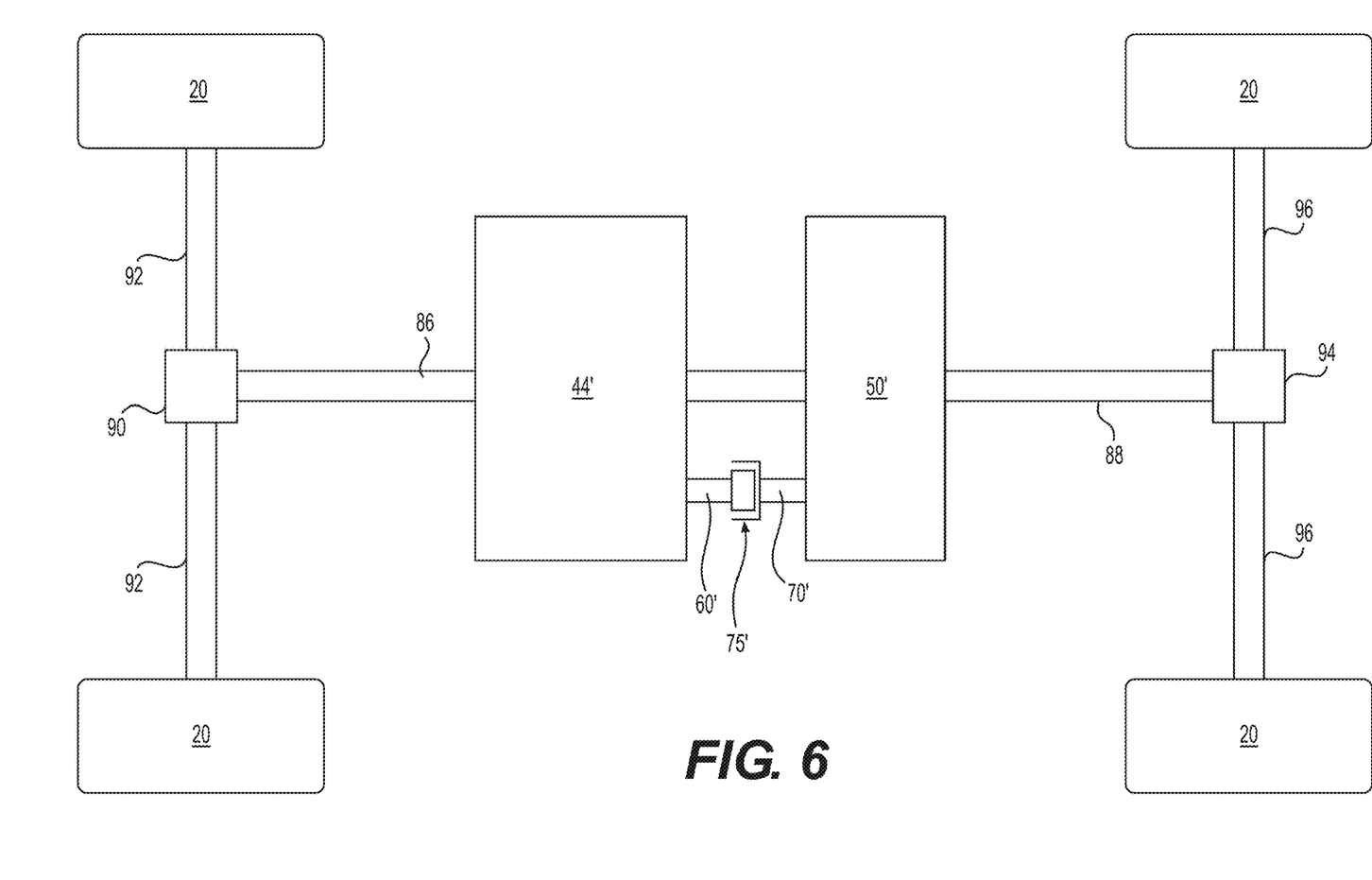
FIG. 6 is a schematic representation of an alternative power train of the RUV of FIG. 1.

FIG. 6 illustrates an alternative implementation of the power train of the RUV 10. For simplicity, components of the power train illustrated in FIG. 6 that correspond to those previously described with respect to FIG. 2 have been labelled with the same reference numeral and will not be described again.

In the implementation of FIG. 6, the RUV 10 has an engine 44'. The engine 44' has a rearward extending output shaft 60'. The output shaft 60' is operatively connected to the crankshaft of the engine 44' by bevel gears for example. The RUV 10 also has a transmission 50' that is spaced from the engine 44'. The transmission 50' has a forwardly extending input shaft 70'. A centrifugal clutch 75' is connected between the output shaft 60' of the engine 44' and the input shaft 70' of the transmission 50'. As such in the present implementation, the output shaft 60' of the engine 44' is the input shaft of the centrifugal clutch 75' and the input shaft of the transmission 50' is the output shaft of the centrifugal clutch 75'. At low output shaft speeds, the centrifugal clutch 75' is disengaged and the input shaft 70' of the transmission 50' can turn relative to the output shaft 60' of the engine 44'. The output shaft speed at which the clutch 75' is engaged is referred to herein as the clutch engagement speed. It is contemplated that the clutch 75' could not be connected directly to the output shaft 60' of the engine 44', in which case the clutch engagement speed would be the speed of the input shaft of the clutch 75' at which the clutch 75' is engaged and that there is a corresponding engine speed that causes the input shaft of the clutch 75' to turn at the clutch engagement speed. For example, the clutch 75' could be connected between a driven pulley of a CVT and the input shaft of a transmission. In another example, the clutch 75' could be connected between the transmission and the driveshafts 86, 88.

In a RUV 10 having this type of power train, the ECU 58 controls the operation of the engine 44' in the same manner as described above with respect to FIGS. 3 and 4, but instead of the control being based relative to the driving pulley engagement speed, driven pulley speed and driving pulley speed, it is relative to the clutch engagement speed, the output shaft speed of the clutch 75' (i.e. the speed of the input shaft 70' of the transmission 50') and the input shaft speed of the clutch 75' (i.e. the speed of the output shaft 60' of the engine 44') respectively. For example, should the clutch 75' be disengaged, with the throttle pedal 42 being completely released and the output shaft speed (i.e. the speed of the input shaft 70' of the transmission 50') increasing, the ECU 58 controls the operation of the engine 44 to increase the engine speed as the output shaft speed increases until the clutch engagement speed is reached and once the clutch 75' is engaged, the ECU 58 controls the operation of the engine 44 to cause engine braking. The control of the engine speed to cause engine braking is independent of the operator and the throttle pedal position.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for controlling an internal combustion engine of a vehicle, the vehicle comprising:
    the internal combustion engine;
    a continuously variable transmission (CVT) comprising:
        a driving pulley operatively connected to the engine;
        a driven pulley; and
        a belt looped around the driving and driven pulleys, the belt transmitting torque between the driving and driven pulleys; and
    at least one ground engaging member operatively connected to the driven pulley;
    the method comprising:
        determining a first speed, the first speed being proportional to a driven pulley speed;
        determining a throttle operator position;
        determining a desired engine speed corresponding to the throttle operator position;
        when the driven pulley speed is less than a predetermined driven pulley speed and an actual engine speed is less than an engine speed causing a driving pulley speed to be a driving pulley engagement speed:
            controlling the engine to increase the actual engine speed to increase the driving pulley speed to be at least the driving pulley engagement speed; and
        when the driven pulley speed is above the predetermined driven pulley speed, the actual engine speed is greater than the engine speed causing the driving pulley speed to be the driving pulley engagement speed, and the desired engine speed is less than the engine speed causing the driving pulley speed to be the driving pulley engagement speed:
            controlling the engine to operate under conditions corresponding to an engine braking speed thereby causing engine braking, the engine braking speed being less than the actual engine speed.

2. The method of claim 1, wherein the engine braking speed is greater than the engine speed causing the driving pulley speed to be the driving pulley engagement speed.

3. The method of claim 1, wherein the driving pulley speed is equal to the actual engine speed.

4. The method of claim 1, wherein when the driven pulley speed is less than the predetermined driven pulley speed and the actual engine speed is less than the engine speed causing the driving pulley speed to be the driving pulley engagement speed, the method further comprises:
    controlling the engine to increase the actual engine speed as the driven pulley speed increases.

5. The method of claim 1, further comprising determining the engine braking speed;
    wherein determining the engine braking speed comprises:
        multiplying the driven pulley speed by a CVT target ratio.

6. The method of claim 5, wherein determining the engine braking speed further comprises:
    subtracting an engine speed offset from a result of the driven pulley speed being multiplied by the CVT target ratio.

7. The method of claim 6, wherein the CVT target ratio is based on the actual engine speed.

8. The method of claim 6, wherein the engine speed offset increases as the actual engine speed increases.

9. The method of claim 1, wherein the vehicle further comprises a geared transmission operatively connecting the at least one ground engaging member to the driven pulley;
wherein the first speed is a speed of a rotating element operatively connecting the geared transmission to the at least one ground engaging member;
wherein the method further comprises determining a drive mode of the geared transmission; and
wherein the driven pulley speed is determined by multiplying the first speed by a gear ratio corresponding to the drive mode.

10. The method of claim 1, wherein controlling the engine to operate under conditions corresponding to the engine braking speed comprises:
positioning a valve controlling a supply of air to the engine at a position that is less than a position that would be necessary to operate the engine at the actual engine speed.

11. The method of claim 10, wherein the valve is a throttle valve of a throttle body.

12. The method of claim 1, further comprising determining an actual engine speed.

13. The method of claim 12, wherein determining the actual engine speed includes determining a speed of rotation of a driveshaft operatively connecting the engine to the at least one ground engaging member.

14. The method of claim 12, wherein determining the actual engine speed includes determining a vehicle speed.

15. A method for controlling an internal combustion engine of a vehicle, the vehicle comprising:
the internal combustion engine;
at least one ground engaging member operatively connected to the driven pulley; and
a centrifugal clutch having an input shaft operatively connected to the engine and an output shaft operatively connected to the at least one ground engaging member;
the method comprising:
determining a first speed, the first speed being proportional to an output shaft speed;
determining a throttle operator position;
determining a desired engine speed corresponding to the throttle operator position;
when the output shaft speed is less than a predetermined output shaft speed and an actual engine speed is less than an engine speed causing an input shaft speed to be a clutch engagement speed:
controlling the engine to increase the actual engine speed to increase the input shaft speed to be at least the clutch engagement speed; and
when the output shaft speed is above the predetermined output shaft speed, the actual engine speed is greater than the engine speed causing the input shaft speed to be the clutch engagement speed, and the desired engine speed is less than the engine speed causing the input shaft speed to be the clutch engagement speed:
controlling the engine to operate under conditions corresponding to an engine braking speed thereby causing engine braking, the engine braking speed being less than the actual engine speed.

16. The method of claim 15, wherein the engine braking speed is greater than the engine speed causing the input shaft speed to be the clutch engagement speed.

17. The method of claim 15, wherein when the output shaft speed is less than the predetermined output shaft speed and the actual engine speed is less than the engine speed causing the input shaft speed to be the clutch engagement speed, the method further comprises:
controlling the engine to increase the actual engine speed as the output shaft speed increases.

18. The method of claim 15, wherein controlling the engine to operate under conditions corresponding to the engine braking speed comprises:
positioning a valve controlling a supply of air to the engine at a position that is less than a position that would be necessary to operate the engine at the actual engine speed.

19. The method of claim 18, wherein the valve is a throttle valve of a throttle body.

* * * * *